United States Patent
Anspaugh et al.

(10) Patent No.: US 10,793,179 B2
(45) Date of Patent: Oct. 6, 2020

(54) ADJUSTABLE STEERING COLUMN ASSEMBLY

(71) Applicant: STEERING SOLUTIONS IP HOLDING CORPORATION, Saginaw, MI (US)

(72) Inventors: Michael P. Anspaugh, Bay City, MI (US); Donald A. Buzzard, Saginaw, MI (US); John C. Maxwell, Saginaw, MI (US); John F. Schulz, Hemlock, MI (US); Melvin L. Tinnin, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/055,750

(22) Filed: Aug. 6, 2018

(65) Prior Publication Data
US 2020/0039564 A1    Feb. 6, 2020

(51) Int. Cl.
*B62D 1/184* (2006.01)
*B62D 1/185* (2006.01)
*B62D 1/189* (2006.01)

(52) U.S. Cl.
CPC ............ *B62D 1/184* (2013.01); *B62D 1/185* (2013.01); *B62D 1/189* (2013.01)

(58) Field of Classification Search
CPC ........ B62D 1/181; B62D 1/184; B62D 1/185; B62D 1/187; B62D 1/189
See application file for complete search history.

(56) References Cited

U.S. PATENT DOCUMENTS

| | | | | |
|---|---|---|---|---|
| 4,472,982 A * | 9/1984 | Nishikawa | ............. | B62D 1/184 403/24 |
| 5,064,219 A * | 11/1991 | Schaible | ................ | B62D 1/184 280/775 |
| 6,854,355 B2 * | 2/2005 | Schulz | ................... | B62D 1/184 280/775 |
| 7,093,855 B2 * | 8/2006 | Manwaring | ............ | B62D 1/184 280/775 |
| 7,621,197 B2 * | 11/2009 | Manwaring | ............ | B62D 1/184 280/775 |
| 7,635,149 B2 * | 12/2009 | Menjak | ................... | B62D 1/184 280/775 |
| 7,640,824 B2 * | 1/2010 | Manwaring | ............ | B62D 1/184 74/492 |
| 7,730,804 B2 * | 6/2010 | Manwaring | ............ | B62D 1/184 280/775 |
| 8,869,645 B2 * | 10/2014 | Burns | .................... | B62D 1/184 280/775 |
| 8,888,131 B2 * | 11/2014 | Anspaugh | ............. | B62D 1/184 280/775 |

(Continued)

*Primary Examiner* — Barry Gooden, Jr.
(74) *Attorney, Agent, or Firm* — Dickinson Wright PLLC

(57) ABSTRACT

A steering column assembly includes a jacket assembly, a locking assembly, and an adjustment lever. The jacket assembly extends along a steering column axis and is connected to a support bracket. The locking assembly is movable between a locked position that inhibits movement of the jacket assembly relative to the steering column axis and an unlocked position that facilitates movement of the jacket assembly relative to the steering column axis. The adjustment lever is arranged to pivot about a lever axis to move the locking assembly between the locked position and the unlocked position.

19 Claims, 10 Drawing Sheets

(56) References Cited

U.S. PATENT DOCUMENTS

| | | | | |
|---|---|---|---|---|
| 8,960,050 B2* | 2/2015 | Cymbal | ............... | B62D 1/184 |
| | | | | 74/493 |
| 9,393,986 B1* | 7/2016 | Anspaugh | ............... | B62D 1/184 |
| 9,501,082 B2* | 11/2016 | Anspaugh | ............... | B62D 1/184 |
| 9,849,905 B2* | 12/2017 | Anspaugh | ............... | B62D 1/184 |
| 10,160,477 B2* | 12/2018 | Bodtker | ............... | B62D 5/001 |
| 2005/0161930 A1* | 7/2005 | Schafer | ............... | B62D 1/181 |
| | | | | 280/775 |
| 2008/0060467 A1* | 3/2008 | Manwaring | ............ | B62D 1/184 |
| | | | | 74/493 |
| 2014/0000405 A1* | 1/2014 | Anspaugh | ............... | B62D 1/184 |
| | | | | 74/493 |
| 2014/0137693 A1* | 5/2014 | Buzzard | ............... | B62D 1/184 |
| | | | | 74/493 |
| 2017/0259841 A1* | 9/2017 | Anspaugh | ............... | B62D 1/184 |
| 2018/0201295 A1* | 7/2018 | Schnitzer | ............... | B62D 1/184 |
| 2018/0257693 A1* | 9/2018 | Schnitzer | ............... | B62D 1/184 |
| 2019/0291773 A1* | 9/2019 | Specht | ............... | B62D 1/181 |

\* cited by examiner

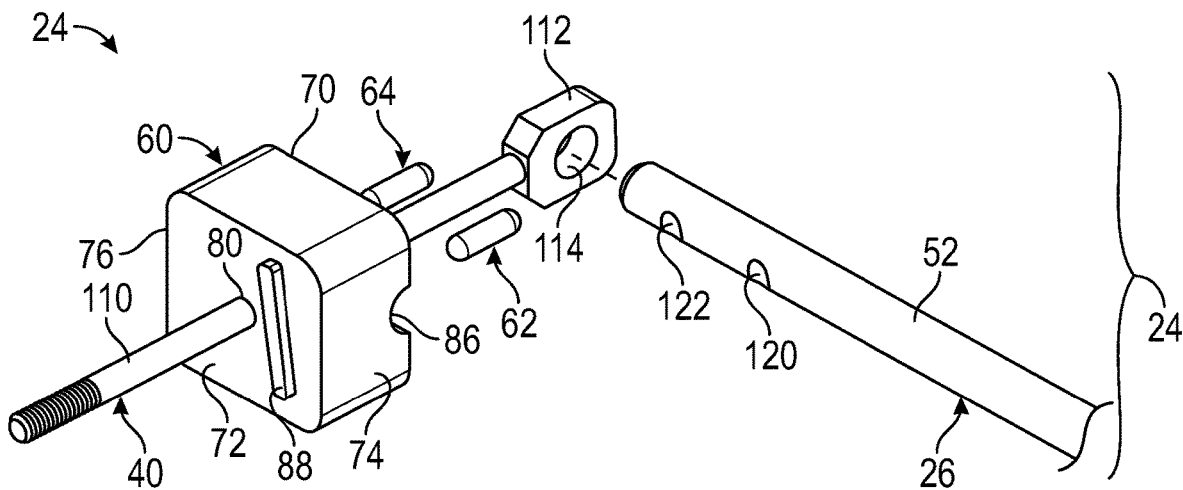
FIG. 2
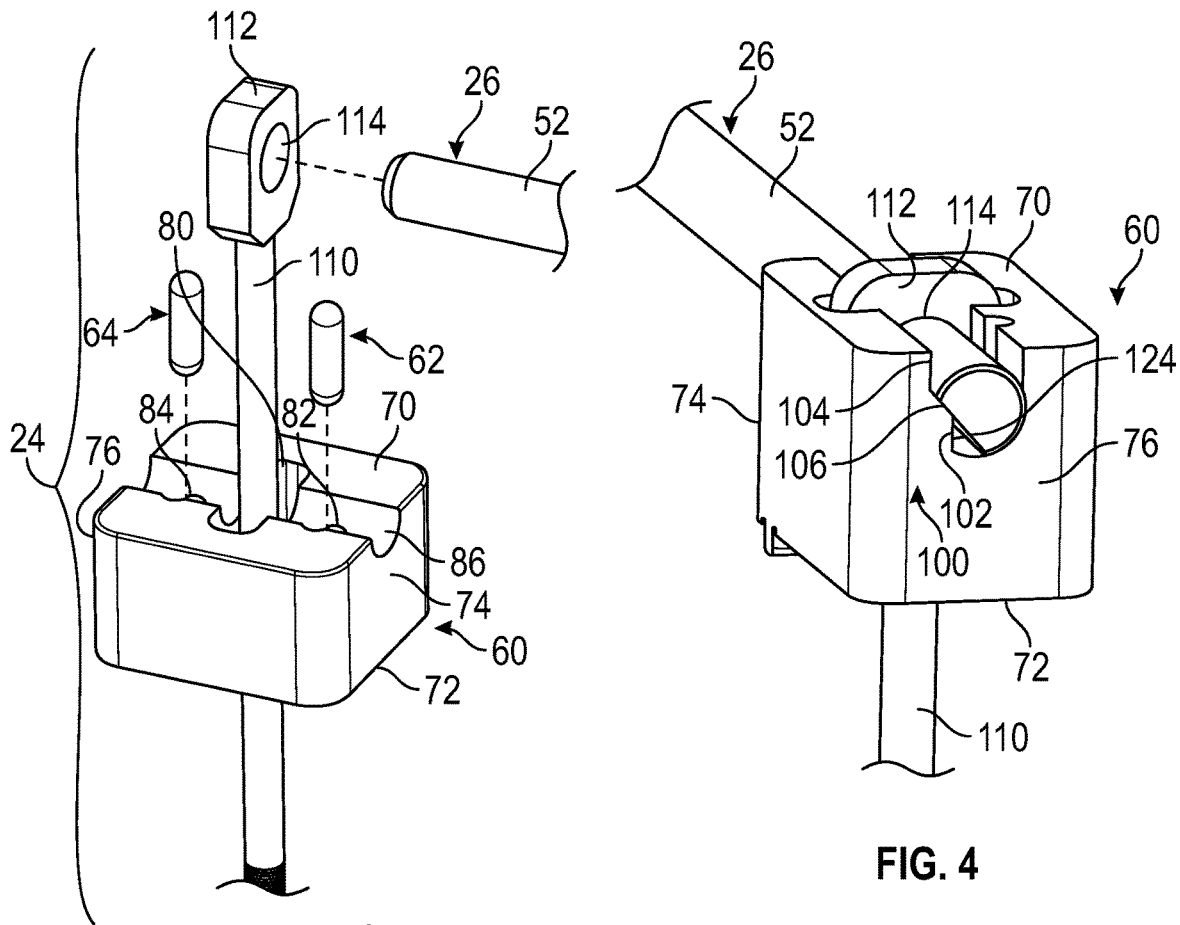
FIG. 3
FIG. 4

ADJUSTABLE STEERING COLUMN ASSEMBLY

BACKGROUND

Adjustable steering column assemblies are provided with a mechanism that enables the steering column assembly to be adjusted along a steering column axis or tilted about a tilt axis. The mechanism to enable adjustment generally employs a locking system to maintain a selected position of the adjustable steering column assembly relative to an operator of the vehicle.

SUMMARY

Disclosed is a steering column assembly that includes a jacket assembly, a locking assembly, and an adjustment lever. The jacket assembly extends along a steering column axis. The jacket assembly is connected to a support bracket. The locking assembly is connected to the support bracket. The locking assembly is movable between a locked position that inhibits movement of the jacket assembly relative to the steering column axis and an unlocked position that facilitates movement of the jacket assembly relative to the steering column axis. The adjustment lever is connected to the locking assembly and extends along a lever axis that is disposed parallel to the steering column axis. The adjustment lever is arranged to pivot about the lever axis to move the locking assembly between the locked position and the unlocked position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 2-4 are various views of a portion of locking assembly of the adjustable steering column assembly;

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. Various elements of the disclosed embodiments may be combined or omitted to form further embodiments of the invention. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
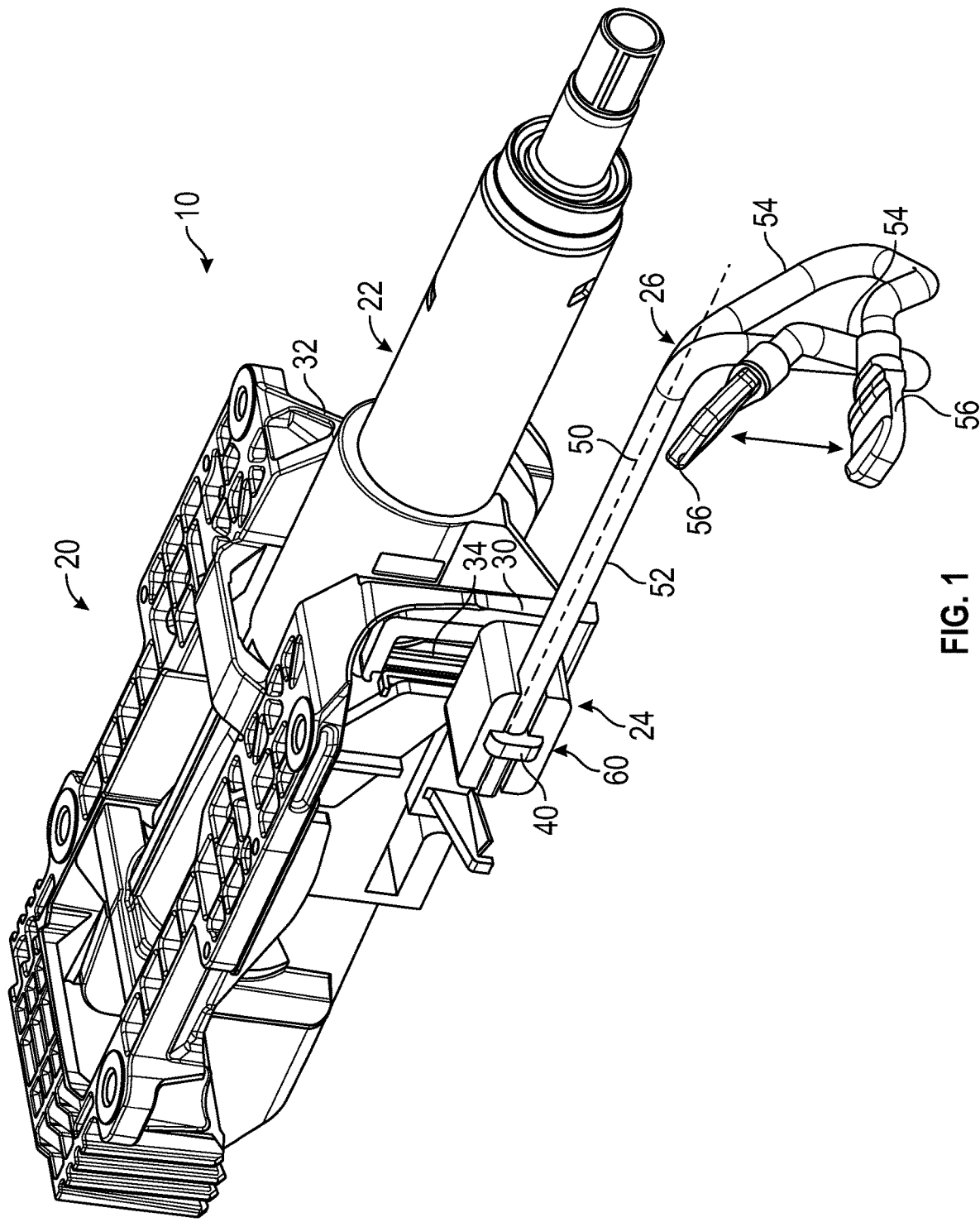
FIG. 1 is a perspective view of an adjustable steering column assembly.
Figure 7:
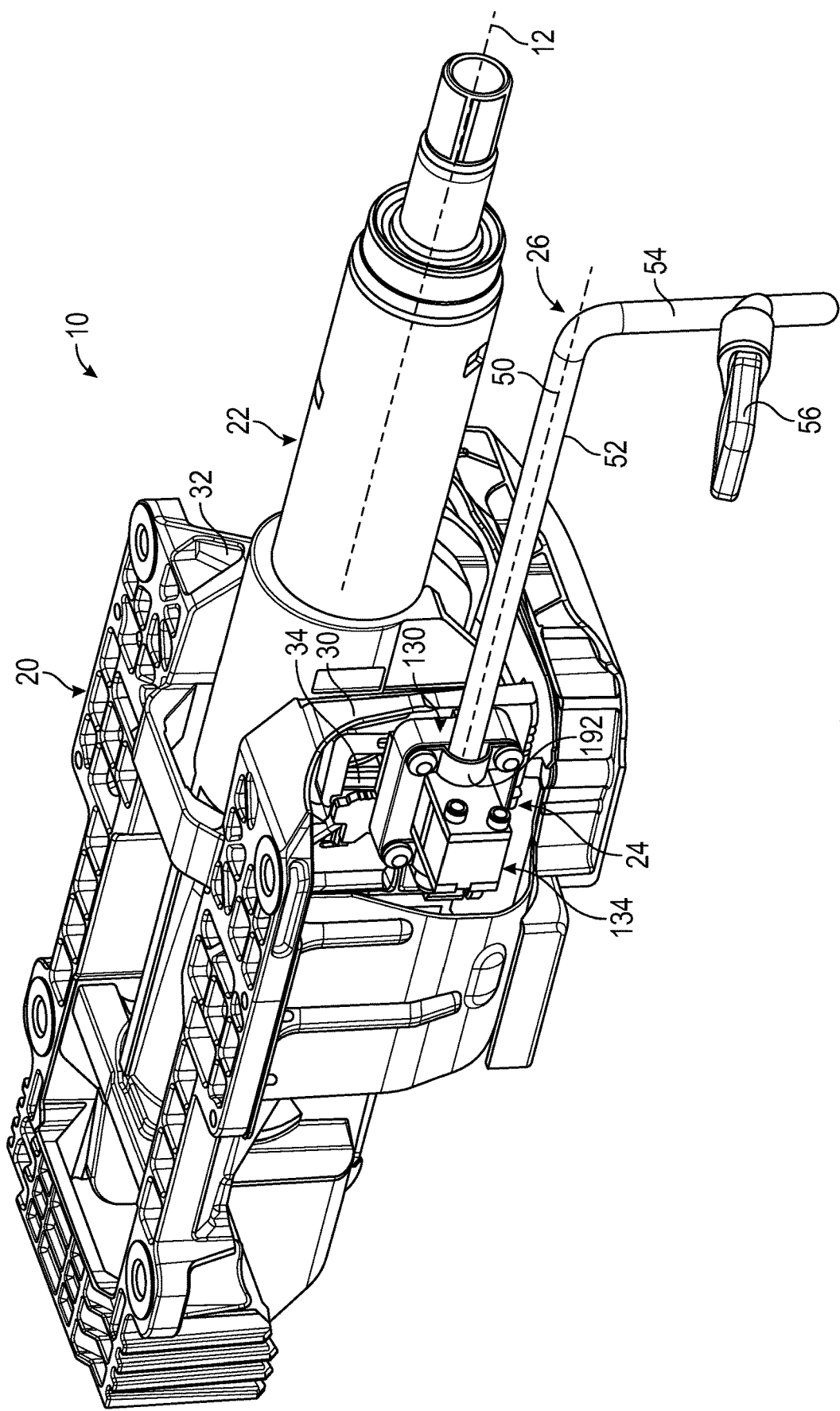
FIG. 7 is a perspective view of an adjustable steering column assembly.

Referring to FIGS. 1 and 7, a steering column assembly 10 is illustrated. The steering column assembly 10 may be an adjustable steering column assembly that may be extendable or retractable along a steering column axis 12. The steering column assembly 10 may also be pivotable or tiltable about a tilt axis or a pivot axis that is disposed generally transverse to the steering column axis 12. The steering column assembly 10 includes a support bracket 20, a jacket assembly 22, a locking assembly 24, and an adjustment lever 26.

The support bracket 20 is arranged to connect the steering column assembly 10 to a vehicle structure such as an instrument panel, dashboard, or the like. The support bracket 20 includes a first arm 30 and a second arm 32 that is spaced apart from and disposed generally parallel to the first arm 30. The first arm 30 defines a first rake slot 34 that extends through the first arm 30 along an axis that is disposed substantially transverse to the steering column axis 12. The second arm 32 defines a second rake slot that extends through the second arm 32 along an axis that is disposed substantially transverse the steering column axis 12.

The jacket assembly 22 is connected to the support bracket 20. The jacket assembly 22 is pivotally connected to the support bracket 20. The jacket assembly 22 is extendable or retractable along the steering column axis 12 to adjust a position of the steering wheel that is coupled to the jacket assembly 22. The jacket assembly 22 is tiltable or pivotable to the extent provided by the first rake slot 34 and/or the second rake slot of the support bracket 20 about the tilt or pivot axis.

The locking assembly 24 is connected to the support bracket 20. The locking assembly 24 may be disposed on the first arm 30 of the support bracket 20, however the locking assembly 24 may be disposed on either arm of the support bracket 20 or other location on the support bracket 20.

Figure 5:
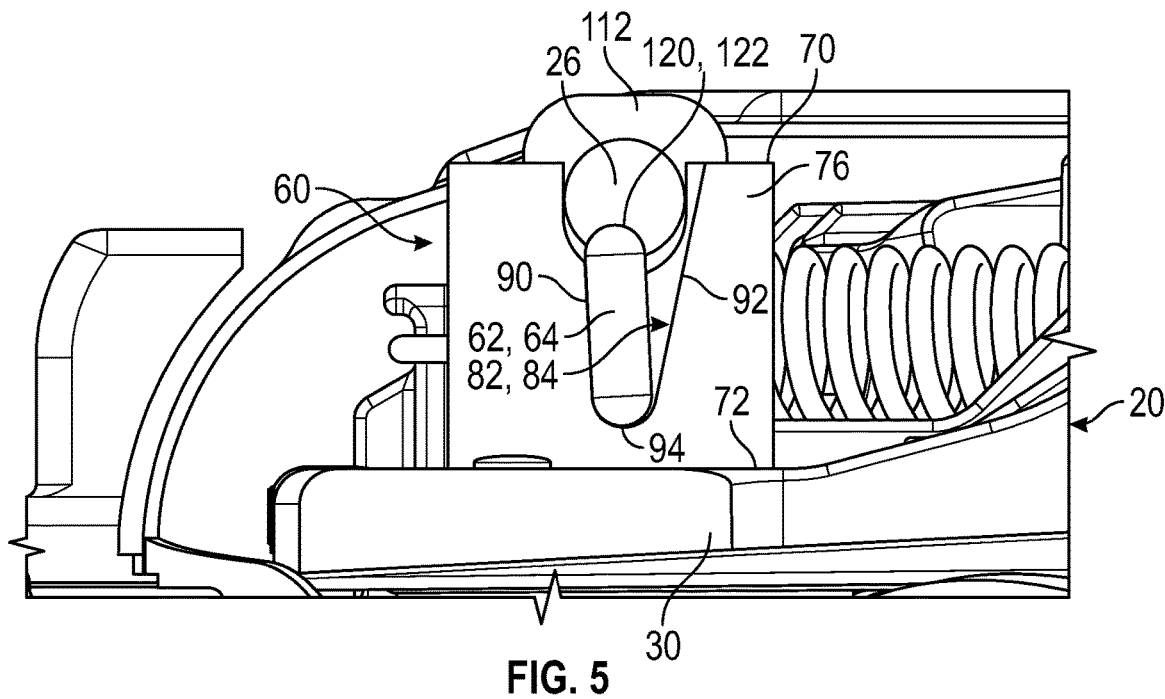
FIG. 5 is a partial section view of the locking assembly in a locked position.
Figure 6:
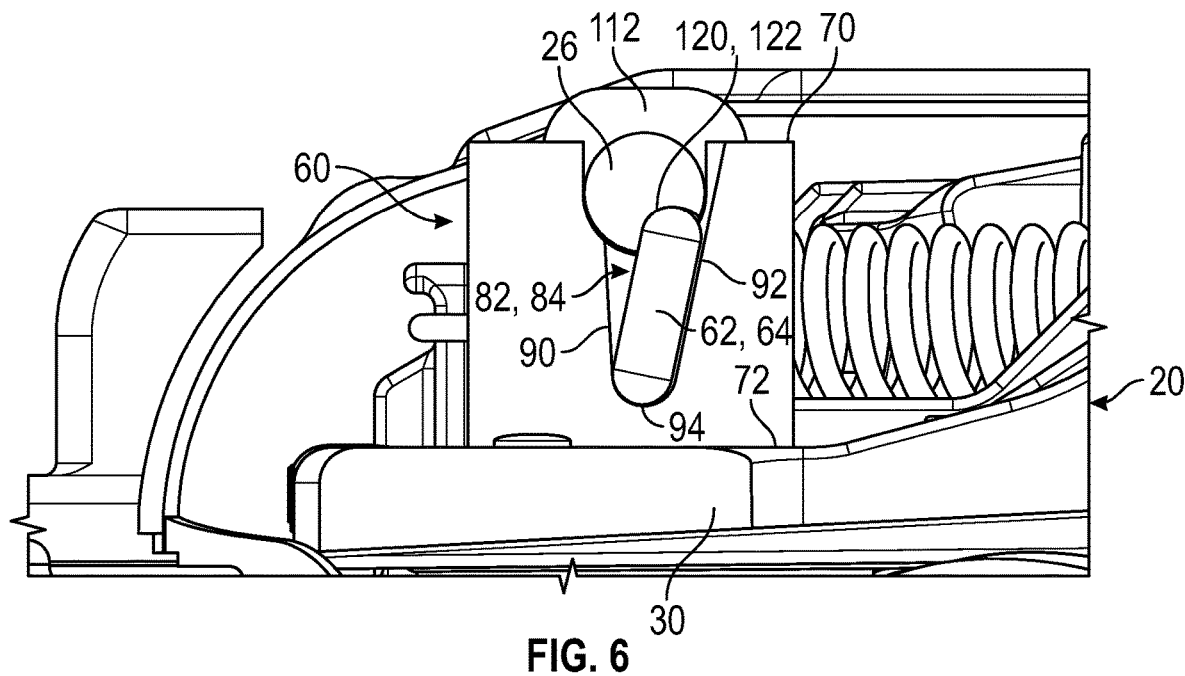
FIG. 6 is a partial section view of the locking assembly and an unlocked position.
Figure 9:
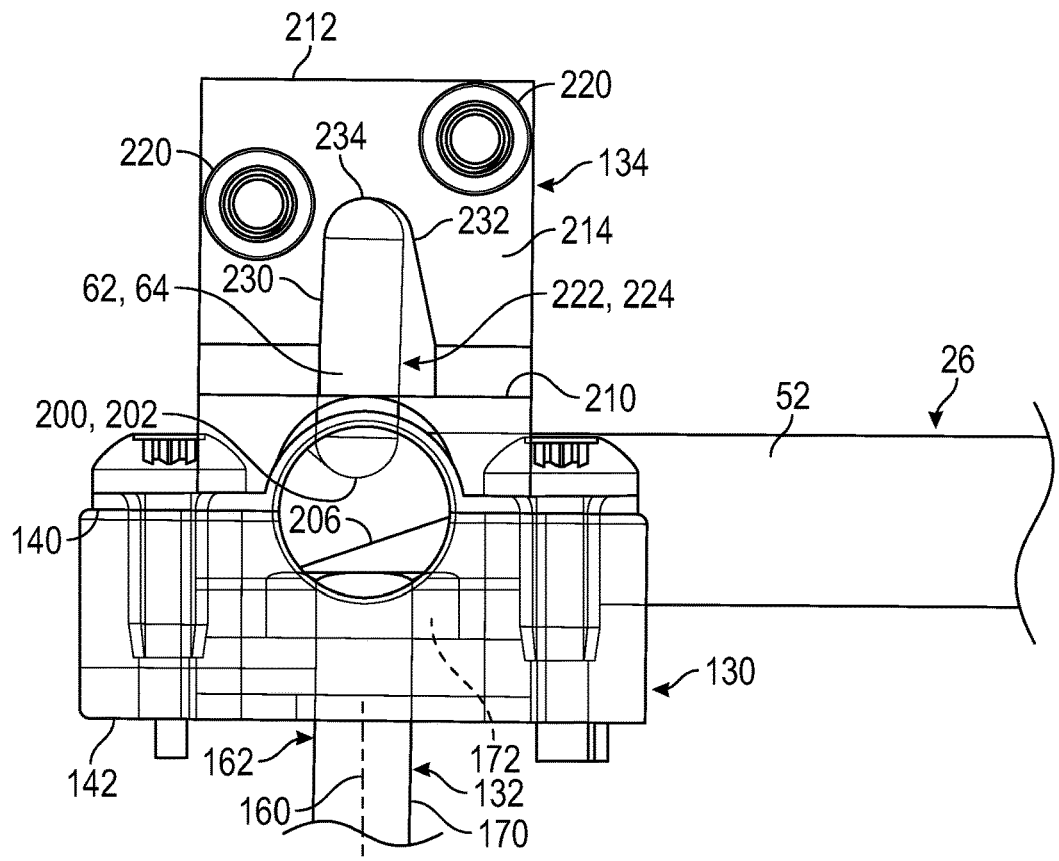
FIG. 9 is a partial section view of the locking assembly in a locked position.
Figure 10:
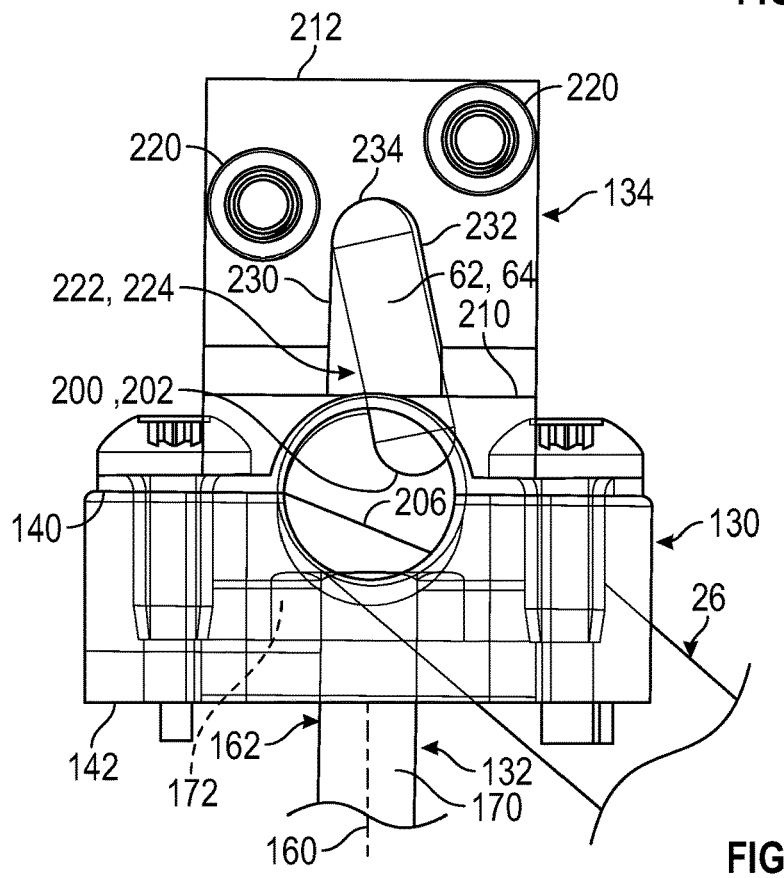
FIG. 10 is a partial section view of the locking assembly and an unlocked position.

The locking assembly 24 is connected to the support bracket 20 and the jacket assembly 22 by a fastener or a bolt 40. The bolt 40 extends through the locking assembly 24, through the first rake slot 34 of the support bracket 20 and at least partially through the jacket assembly 22. The locking assembly 24 is movable between a locked position, as shown in FIGS. 5 and 9, and an unlocked position, as shown in FIGS. 6 and 10. The locked position inhibits movement of the jacket assembly 22 of the steering column assembly 10 about the tilt/pivot axis or relative to the steering column axis 12. The unlocked position facilitates or permits movement of the jacket assembly 22 of the steering column assembly 10 about the tilt/pivot axis or relative to the steering column axis 12.

The locking assembly 24 is movable between the unlocked position and the locked position by actuation of the adjustment lever 26. The adjustment lever 26 is connected to the locking assembly 24 and the bolt 40. The adjustment lever 26 extends along a lever axis 50 that is disposed parallel to the steering column axis 12.

The adjustment lever 26 is arranged to pivot, rotate, or otherwise move about the lever axis 50 to move the locking assembly 24 between the locked position and the unlocked position. The pivoting or rotation of the adjustment lever 26 about the lever axis 50 that is disposed parallel to the steering column axis 12 provides a convenient lever actuation mechanism that enables an operator to easily move the locking assembly 24 between the locked position and the unlocked position as compared to other lever designs.

The adjustment lever 26 includes a first portion 52, a second portion 54 extending from the first portion 52, and a handle 56 connected to the second portion. The first portion 52 is a substantially straight portion that extends along the lever axis 50. The first portion 52 is connected to the locking assembly 24 through the bolt 40. The second portion 54 extends from the first portion 52 and is disposed in a non-parallel relationship with respect to the lever axis 50 and the first portion 52. The second portion 54 may have a shape that enables the handle 56 to be disposed closer to an operator of the vehicle as well as enables the handle 56 to be tucked up and away from an operator's body while the adjustment lever 26 and the locking assembly 24 are in the locked position. In other embodiments, the handle 56 may be rotated down towards an operator's body while the adjustment lever 26 and the locking assembly 24 are in the locked position.

The handle 56 of the adjustment lever 26 is arranged to pivot about or relative to the lever axis 50 to move the adjustment lever 26 and the locking assembly 24 between the locked position and the unlocked position. The handle 56 is disposed proximate the jacket assembly 22 while in the locked position and the handle 56 is pivoted away from the jacket assembly 22 while in the unlocked position, as shown in FIG. 1.

The handle 56 of the adjustment lever 26 may be arranged to move along with the jacket assembly 22 during adjustment of the jacket assembly 22 along the steering column axis 12 such that the handle 56 remains within a predetermined distance from a steering wheel attached to the jacket assembly 22 during adjustment, as shown in FIGS. 11, 12, 13, and 14. In such an arrangement, the second portion 54 of the adjustment lever 26 may move relative to the first portion 52 of the adjustment lever and the locking assembly 24 and the bolt 40 during adjustment of the jacket assembly 22 along the steering column axis 12.

Referring to FIGS. 11-14, a support structure such as a collar assembly 58 is disposed about and is connected to the jacket assembly 22. The collar assembly 58 connects the second portion 54 of the adjustment lever 26 to facilitate the movement of the second portion 54 relative to the first portion 52 during adjustment of the jacket assembly 22 along the steering column axis 12. The collar assembly 58 may include a first collar portion 58a and a second collar portion 58b connected to the first collar portion 58a. The first collar portion 58a and the second collar portion 58b may be clamped to the jacket assembly 22 or may be integrally formed together and press fit to the jacket assembly 22.

The first collar portion 58a includes an extension portion 58c that defines a collar opening 58d that extends along the lever axis 50. A bearing or a bushing 58e is disposed within the collar opening 58d to facilitate the translation of at least a portion of the adjustment lever 26 along the lever axis 50. A generally straight portion of the second portion 54 of the adjustment lever 26 extends into and/or through the collar opening 58d. The second portion 54 is slidingly supported by the bearing or the bushing 58e disposed within the collar opening 58d.

Figure 11:
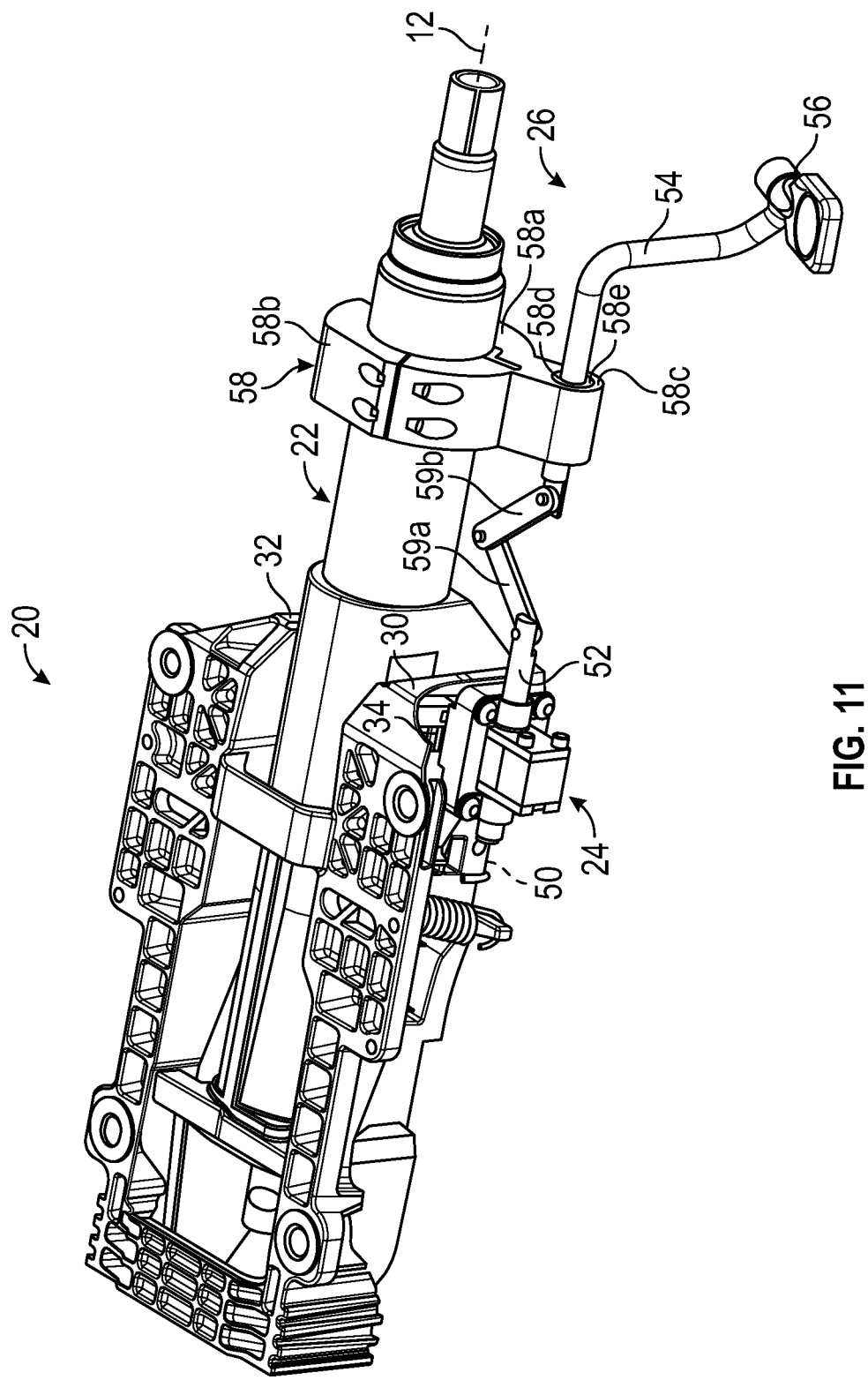
FIGS. 11 and 12 are perspective views of an adjustable steering column in a retracted position and an extended position.
Figure 12:
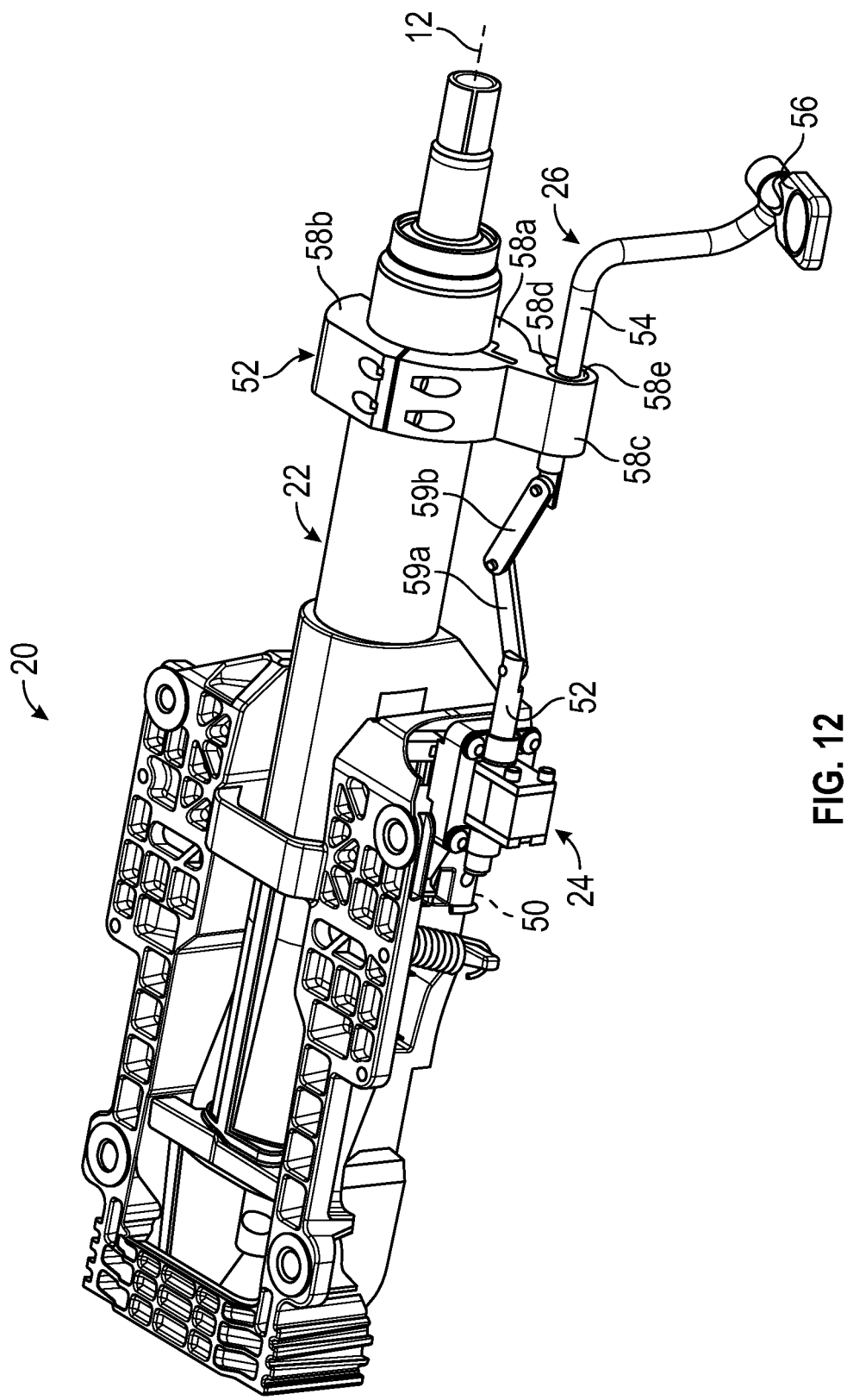

Referring to FIGS. 11 and 12, the adjustment lever 26 includes a linkage assembly having a third portion 59a and a fourth portion 59b that extend between the first portion 52 and the second portion 54. The third portion 59a extends between and is pivotally, hingedly, or otherwise movably connected to ends of the first portion 52 and the fourth portion 59b. The fourth portion 59b extends between and is pivotally, hingedly, or otherwise movably connected to ends of the third portion 59a and the second portion 54. The third portion 59a and the fourth portion 59b of the linkage assembly may move, expand, or collapse relative to the lever axis 50 to facilitate the movement of the second portion 54 having the handle 56 relative to the first portion 52 of the adjustment lever 26 during telescope adjustment of the between a retracted position, as shown in FIG. 11, and an extended position steering column assembly 10, as shown in FIG. 12.

Figure 13:
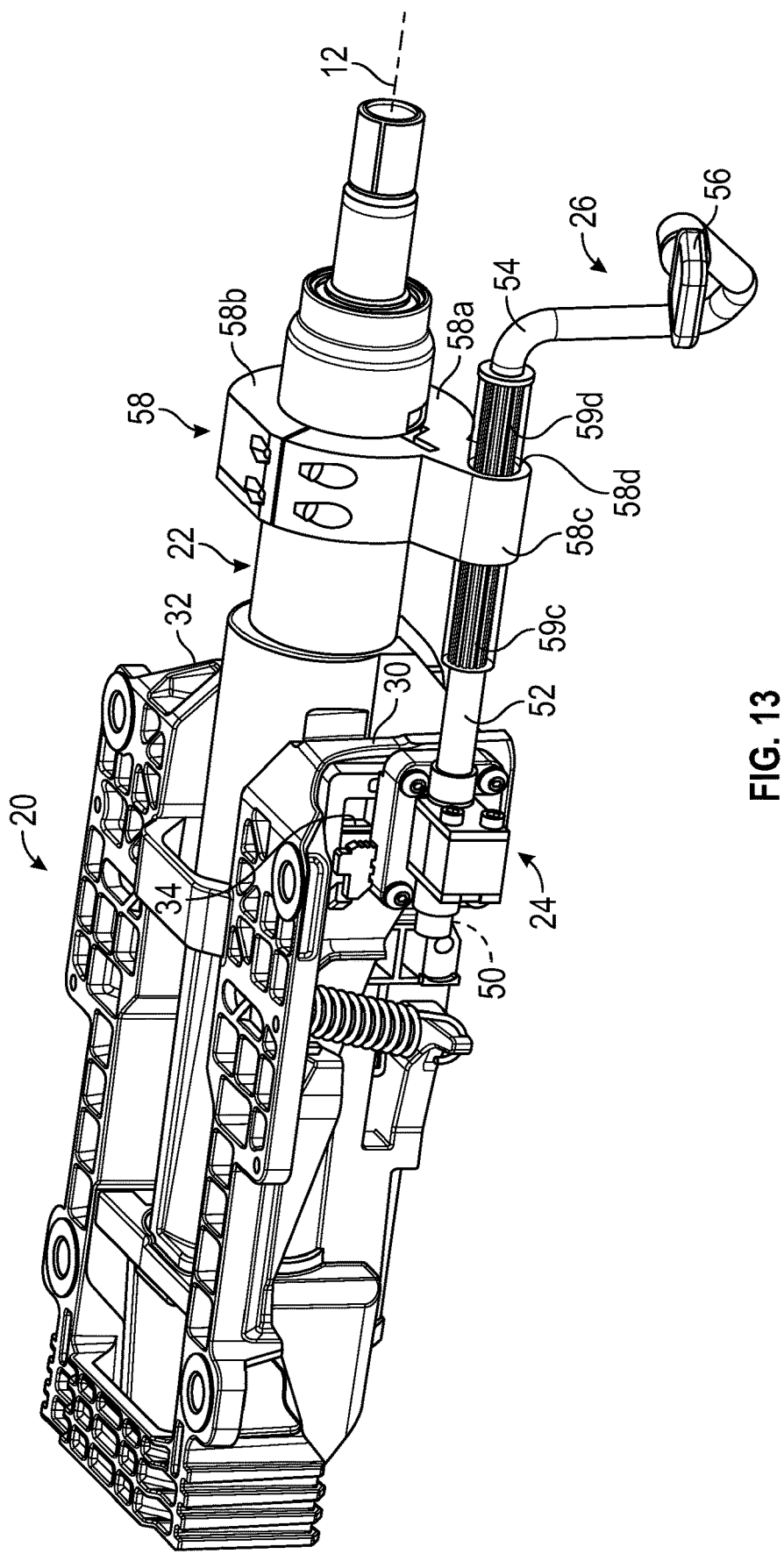
FIGS. 13 and 14 are perspective views of an adjustable steering column in a retracted position and an extended position.
Figure 14:
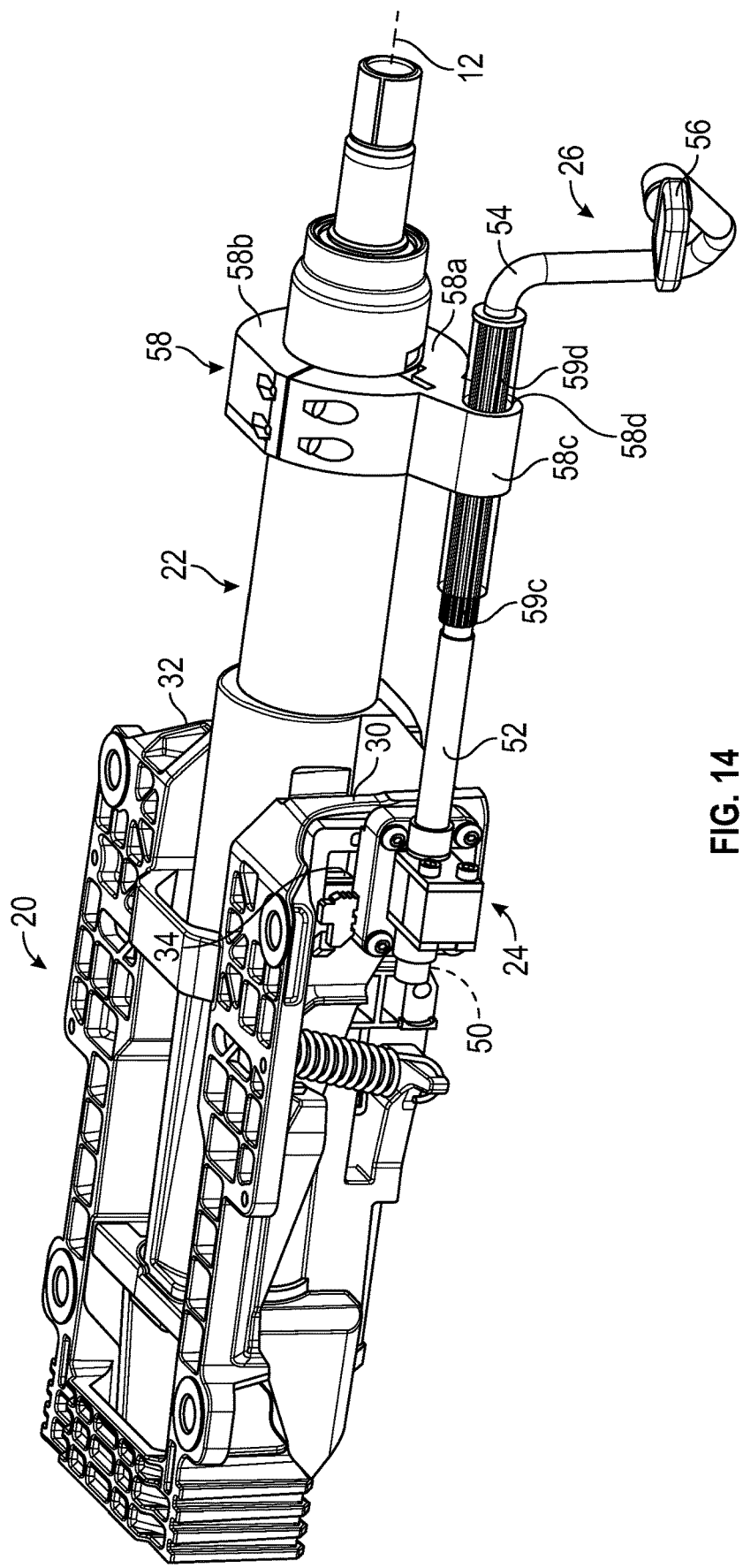

Referring to FIGS. 13 and 14, the first portion 52 of the adjustment lever 26 is provided with a first plurality of engagement members 59c that are defined by or disposed on an exterior surface of the first portion 52. The second portion 54 of the adjustment lever 26 is provided with a second plurality of engagement members 59d that are defined by or disposed on an interior surface of a hollow portion of the second portion 54. The first portion 52 extends into the second portion 54 such that the first plurality of engagement members 59c engage the second plurality of engagement members 59d. In other embodiments, the second portion 54 may extend into the first portion 52. The first plurality of engagement members 59c and the second plurality of engagement members 59d facilitate the sliding movement between the second portion 54 and the first portion 52 of the adjustment lever 26 during telescope adjustment of the steering column assembly 10 between a retracted position, as shown in FIG. 13, and an extended position, as shown in FIG. 14. Engagement between the first plurality of engagement members 59c and the second plurality of engagement members 59d facilitate the rotation of the adjustment lever 26 about the lever axis 50 between the locked position and the unlocked position.

In at least one embodiment, the adjustment lever 26 may be inhibited from moving along with the jacket assembly 22 such that a distance between the handle 56 and the steering wheel attached to the jacket assembly 22 may vary during adjustment.

The locking assembly 24 may have a first arrangement, as shown in FIGS. 1-6. The locking assembly 24 includes a lock housing 60, the bolt 40, a first clamp pin 62, and a second clamp pin 64.

The lock housing 60 is disposed on the support bracket 20. The lock housing 60 includes a first face 70, a second face 72 that is disposed opposite the first face 70, a first end 74 that extends between the first face 70 and the second face 72, and a second end 76 that extends between the first face 70 and the second face 72. The lock housing 60 defines a central opening 80, a first pin pocket 82, a second pin pocket 84, a groove 86, and a tab 88.

The central opening 80 extends from the first face 70 towards the second face 72. The central opening 80 is arranged to receive the bolt 40 along an axis that is disposed substantially transverse to the steering column axis 12.

The first pin pocket 82 is disposed on a first side of the central opening 80 and the second pin pocket 84 is disposed on a second side of the central opening 80 such that the central opening 80 is disposed between the first pin pocket 82 and the second pin pocket 84. The first pin pocket 82 and the second pin pocket 84 each extend from the first face 70 towards the second face 72.

Each of the first pin pocket 82 and the second pin pocket 84 includes a first side surface 90, a second side surface 92, and a pocket end surface 94, as shown in FIGS. 5 and 6. The first side surface 90 extends between the first face 70 and the pocket end surface 94. The second side surface 92 is spaced apart from the first side surface 90. The second side surface 92 extends between the first face 70 and the pocket end surface 94. The second side surface 92 is disposed in a non-parallel and non-perpendicular relationship with respect to the first side surface 90. The second side surface 92 becomes progressively closer to the first side surface 90 in a direction that extends from the first face 70 towards the second face 72. The pocket end surface 94 extends between distal ends of the first side surface 90 and the second side surface 92.

The groove 86 extends from the first face 70 towards the second face 72. The groove 86 extends across the lock housing 60 and extends between the first end 74 and the second end 76. Referring to FIG. 4, a travel stop feature 100 is defined proximate an intersection between the groove 86 and the first end 74 and/or the second end 76 of the lock housing 60. The travel stop feature 100 includes a first surface 102, a second surface 104, and a third surface 106. The first surface 102 extends from and is disposed generally perpendicular to the bottom surface of the groove 86. The second surface 104 extends from the first face 70 towards the first surface 102. The second surface 104 is disposed generally perpendicular to the first face 70 and is disposed generally parallel to the first surface 102. The third surface 106 extends between ends of the second surface 104 and the first surface 102. The third surface 106 is disposed in a non-perpendicular and non-parallel relationship with respect to the first surface 102 and the second surface 104.

The tab 88 extends from the second face 72 of the lock housing 60. The tab 88 may be arranged as an anti-rotation feature that extends into or is at least partially received by the first arm 30 of the support bracket 20. The tab 88 may be arranged to inhibit pivoting or rotation of the lock housing 60 about an axis along which the bolt 40 extends.

The bolt 40 extends through the central opening 80 of the lock housing 60 and extends into and at least partially through the jacket assembly 22. The bolt 40 is arranged to couple the locking assembly 24 to the support bracket 20 and the jacket assembly 22. The bolt 40 includes a shank 110 and a bolt head 112. The bolt head 112 extends from the shank 110 and defines an opening 114. The opening 114 extends through the bolt head 112 along an axis that is disposed substantially parallel to the lever axis 50.

An end of the first portion 52 of the adjustment lever 26 extends into the opening 114. The first portion 52 is received within the groove 86 and extends across the central opening 80. The first portion 52 of the adjustment lever 26 defines a first pocket 120, a second pocket 122, and a flat 124. The first pocket 120 and the second pocket 122 extend at least partially across the first portion 52 of the adjustment lever 26. The flat 124 is disposed proximate the end of the first portion 52 of the adjustment lever 26. The flat 124 is arranged to selectively engage the travel stop feature 100.

The first clamp pin 62 extends between the first pin pocket 82 of the lock housing 60 and the first pocket 120 of the adjustment lever 26. The second clamp pin 64 extends between the second pin pocket 84 of the lock housing 60 and the second pocket 122 of the adjustment lever 26.

Referring to FIG. 5, at least one of the first clamp pin 62 and the second clamp pin 64 is disposed generally perpendicular to the lever axis 50 and engages the first side surface 90 while the locking assembly 24 is in the locked position.

Referring to FIG. 6, at least one of the first clamp pin 62 and the second clamp pin 64 is disposed in a non-perpendicular relationship with respect to the lever axis 50 and engages the second side surface 92 while the locking assembly 24 is in the unlocked position.

The locking assembly 24 may have a second arrangement, as shown in FIGS. 7-10. The locking assembly 24 includes a lock housing 130, a bolt assembly 132, a pin housing 134, the first clamp pin 62, and the second clamp pin 64.

The lock housing 130 is disposed on the support bracket 20. The lock housing 130 includes a first face 140, a second face 142 that is disposed opposite the first face 140, a first end 144 that extends between the first face 140 and the second face 142, and a second end 146 that extends between the first face 140 and the second face 142. The lock housing 130 defines a central opening 150 and a groove 152.

The central opening 150 extends from the first face 140 towards the second face 142. The bolt assembly 132 is arranged to extend at least partially through the central opening 150. The groove 152 extends across the lock housing 130 between the first end 144 and the second end 146. The groove 152 extends from the first face 140 towards the second face 142.

The bolt assembly 132 extends through the central opening 150 of the lock housing 130 and extends into and at least partially through the jacket assembly 22 along a bolt axis 160 to couple the locking assembly 24 to the support bracket 20 and the jacket assembly 22. The bolt axis 160 is disposed generally transverse to the lever axis 50 of the adjustment lever 26.

The bolt assembly 132 includes a bolt 162 and a mounting bracket 164. The bolt 162 includes a shank 170 that extends through the central opening 150 and into the jacket assembly 22 and a bolt head 172 that is disposed at an end of the shank 170. The bolt head 172 is arranged to engage a surface of the mounting bracket 164 to couple the mounting bracket 164 to the bolt 162.

The mounting bracket 164 includes a base 180, a first arm 182, and a second arm 184. The base 180 may be a generally planar member through which the shank 170 extends and the bolt head 172 may engage. The first arm 182 and the second arm 184 extends from opposite ends of the base 180. The first arm 182 and the second arm 184 are disposed generally perpendicular to the base 180. The first arm 182 and the second arm 184 each extend from the base 180 in a direction that extends away from the first arm 30 of the support bracket 20.

The first arm 182 and the second arm 184 each define an arm opening 186 and a fastener opening 188. The arm opening 186 is arranged to receive the adjustment lever 26. The fastener opening 188 is spaced apart from the arm opening 186 and is arranged to receive fasteners to couple the pin housing 134 to at least one of the first arm 182 and the second arm 184 of the mounting bracket 164 of the bolt assembly 132.

An end of the first portion 52 of the adjustment lever 26 extends into the arm opening 186 of the first arm 182 and/or the second arm 184 of the mounting bracket 164 of the bolt assembly 132. The first portion 52 of the adjustment lever 26 is received within the groove 152 and extends across the central opening 150 of the lock housing 130. The first portion 52 of the adjustment lever 26 is secured to the lock housing 130 by a bracket 192 and fasteners that extend through the bracket 192 and into the lock housing 130.

The first portion 52 of the adjustment lever 26 defines a first pocket 200, a second pocket 202, a notch 204, and a flat 206. The first pocket 200 and the second pocket 202 extend at least partially across the first portion 52 of the adjustment lever 26. The notch 204 is disposed opposite the first pocket 200 and the second pocket 202. The notch 204 extends at least partially across the first portion 52 of the adjustment lever 26 and is generally aligned with the first pocket 200 and the second pocket 202. The bolt head 172 of the bolt 162 is arranged to be received within the notch 204. The flat 206 extends across the first portion 52 of the adjustment lever 26 and is disposed proximate the end of the first portion 52. The flat 206 may be spaced apart from the first pocket 200, the second pocket 202, and the notch 204.

The pin housing 134 may be operatively connected to the first and second arms 182, 184 of the mounting bracket 164 of the bolt assembly 132. In some embodiments, the pin housing 134 may be connected to the lock housing 130.

The pin housing 134 includes a first pin housing face 210 that faces towards the base 180 of the bolt assembly 132, a second pin housing face 212 that is disposed opposite the first pin housing face 210, a first pin housing end 214 extends between the first pin housing face 210 and the second pin housing face 212, and a second pin housing end 216 extend between the first pin housing face 210 and the second pin housing face 212.

The pin housing 134 defines a fastener opening 220, a first pin pocket 222, and a second pin pocket 224. The fastener opening 220 extends from the first pin housing end 214 towards the second pin housing end 216 or may extend from the second pin housing end 216 towards the first pin housing end 214. The fastener opening 220 of the pin housing 134 is proximately aligned with the fastener opening 188 of at least one of the first arm 182 and the second arm 184 of the mounting bracket 164 of the bolt assembly 132. A fastener extends through the fastener opening 220 and the fastener opening 188, to couple the pin housing 134 to the bolt assembly 132.

The first pin pocket 222 and the second pin pocket 224 extend from the first pin housing face 210 towards the second pin housing face 212. The first pin pocket 222 is proximately aligned with the first pocket 200 and the second pin pocket 224 is proximately aligned with the second pocket 202.

Figure 8:
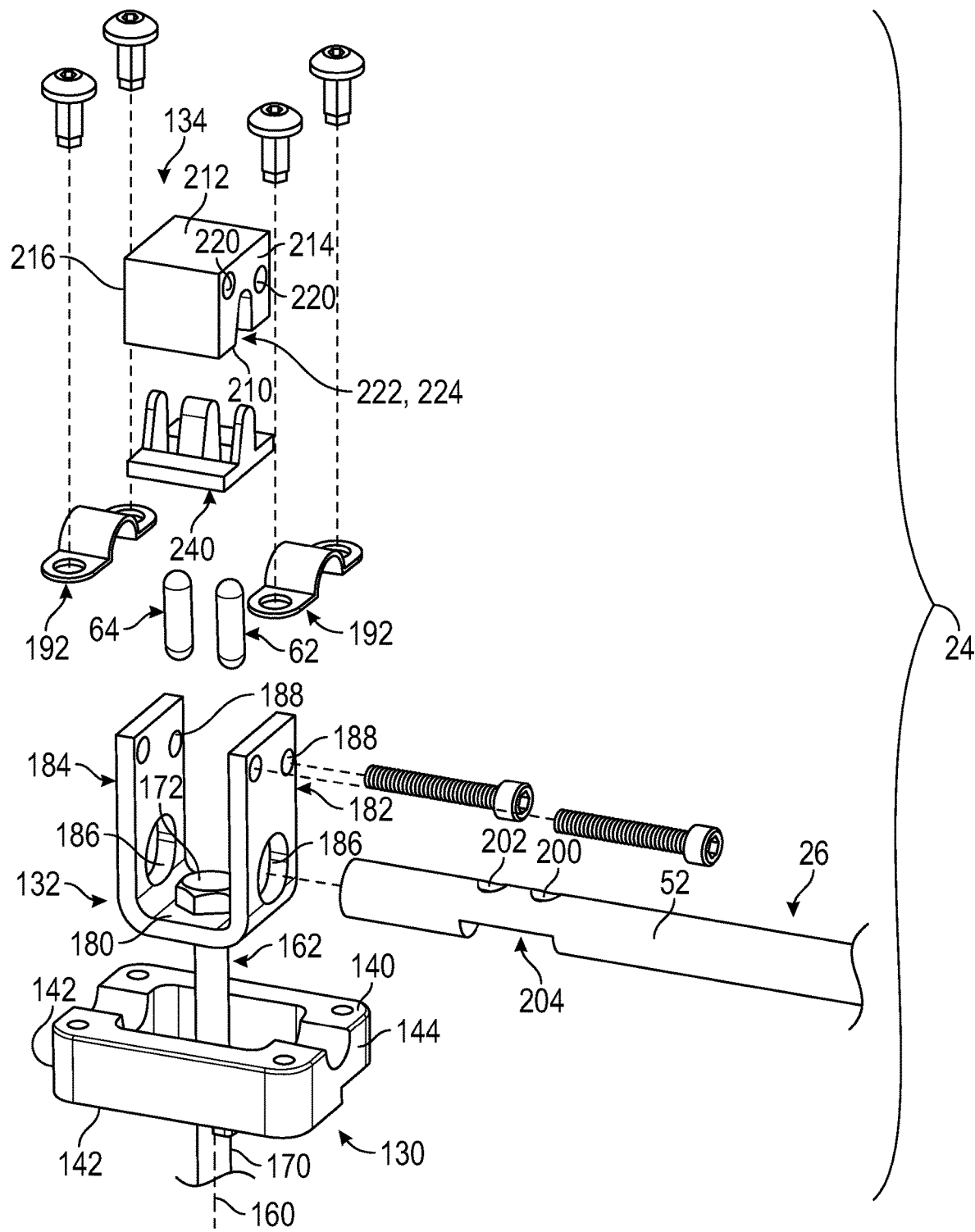
FIG. 8 is a disassembled view of the locking assembly of the adjustable steering column assembly.

Each of the first pin pocket 222 and the second pin pocket 224 includes a first side surface 230, a second side surface 232, and a pocket end surface 234, as shown in FIGS. 8-10. The first side surface 230 extends between first pin housing face 210 and the pocket end surface 234. The second side surface 232 is spaced apart from the first side surface 230 and extends between the first pin housing face 210 and the pocket end surface 234. The second side surface 232 is disposed in a non-parallel and a non-perpendicular relationship with respect to the first side surface 230. The second side surface 232 becomes progressively the closer to the first side surface 230 in a direction that extends from the first pin housing face 210 towards the second pin housing face 212, as shown in FIGS. 9 and 10. The pocket end surface 234 extends between distal ends of the first side surface 230 and the second side surface 232.

The first clamp pin 62 extends between the first pocket 200 of the adjustment lever 26 and the first pin pocket 222 of the pin housing 134. The second clamp pin 64 extends between the second pocket 202 of the adjustment lever 26 and the second pin pocket 224 of the pin housing 134. The first clamp pin 62 and the second clamp pin 64 may be spaced apart from each other by a pin spacer 240. The pin spacer 240 is disposed between the 180 of the bolt assembly 132 and the pin housing 134. The pin spacer 240 may extend at least partially into the pin housing 134. The first clamp pin 62 and the second clamp pin 64 extend through the pin spacer 240.

Referring to FIG. 9, at least one of the first clamp pin 62 and the second clamp pin 64 are disposed generally perpendicular to the lever axis 50 and engages the first side surface 230 while the locking assembly 24 is in the locked position. Referring to FIG. 10, at least one of the first clamp pin 62 and the second clamp pin 64 are disposed in a non-perpendicular relationship with respect to the lever axis 50 and engages the second side surface 232 while the locking assembly 24 is in the unlocked position.

Throughout this specification, the term "attach," "attachment," "connected," "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
a jacket assembly extending along a steering column axis, the jacket assembly is connected to a support bracket;
a locking assembly connected to the support bracket, the locking assembly movable between a locked position that inhibits movement of the jacket assembly relative to the steering column axis and an unlocked position that facilitates movement of the jacket assembly relative to the steering column axis; and
an adjustment lever connected to the locking assembly and extending along a lever axis that is disposed parallel to the steering column axis, the adjustment lever being arranged to rotate about the lever axis to move the locking assembly between the locked position and the unlocked position,
wherein the locking assembly, further comprising:
a lock housing disposed on the support bracket, the lock housing defining a first pin pocket and a second pin pocket, the lock housing being fixed against rotation relative to the support bracket.

2. The steering column assembly of claim 1, the lock housing defining a central opening that extends through the lock housing.

3. The steering column assembly of claim 1, wherein the adjustment lever includes a first portion extending directly from the locking assembly along the lever axis, a second portion that extends from the first portion, and a handle connected to the second portion, wherein the first portion is arranged to rotate about the lever axis to move the locking assembly between the locked position and the unlocked position.

4. The steering column assembly of claim 1, wherein the locking assembly, further comprising:

a bolt that extends through the lock housing and into the jacket assembly along a bolt axis that is disposed transverse to at least one of the steering column axis and the lever axis.

5. The steering column assembly of claim 4, wherein the adjustment lever is connected to the bolt.

6. The steering column assembly of claim 4, wherein the adjustment lever defines a first pocket and a second pocket, wherein each of the first pocket and the second pocket includes a first side surface and a second side surface extending in non-parallel, non-perpendicular relation with one another.

7. The steering column assembly of claim 6, wherein an end of the adjustment lever defines a flat that selectively engages a travel stop feature defined by the lock housing, wherein the flat restricts the degree of rotation of the adjustment lever about the lever axis.

8. The steering column assembly of claim 6, wherein the locking assembly, further comprising:
    a first clamp pin extending between the first pin pocket and the first pocket, the first clamp pin being arranged for pivotal movement within the first pin pocket in response to rotation of the adjustment lever about the lever axis; and
    a second clamp pin extending between the second pin pocket and the second pocket, the second clamp pin being arranged for pivotal movement within the second pin pocket in response to rotation of the adjustment lever about the lever axis.

9. The steering column assembly of claim 8, wherein at least one of the first clamp pin and the second clamp pin are disposed perpendicular to the lever axis while the locking assembly is in the locked position.

10. The steering column assembly of claim 8, wherein at least one of the first clamp pin and the second clamp pin are disposed in a non-perpendicular relationship with respect to the lever axis while the locking assembly is in the unlocked position.

11. A steering column assembly, comprising:
    a jacket assembly extending along a steering column axis, the jacket assembly is connected to a support bracket;
    a locking assembly connected to the support bracket, the locking assembly movable between a locked position that inhibits movement of the jacket assembly relative to the steering column axis and an unlocked position that facilitates movement of the jacket assembly relative to the steering column axis;
    an adjustment lever connected to the locking assembly and extending along a lever axis that is disposed parallel to the steering column axis, the adjustment lever being arranged to rotate about the lever axis to move the locking assembly between the locked position and the unlocked position; and
    the locking assembly, further comprising:
    a lock housing disposed on the support bracket, the lock housing defining a central opening that extends through the lock housing, and
    a bolt assembly extends through the central opening and into the jacket assembly along a bolt axis that is disposed transverse to at least one of the steering column axis and the lever axis.

12. The steering column assembly of claim 11, wherein the adjustment lever extends across the central opening of the lock housing and through the bolt assembly.

13. The steering column assembly of claim 11, wherein the adjustment lever defines a first pocket and a second pocket.

14. The steering column assembly of claim 13, wherein the locking assembly, further comprising:
    a pin housing connected to at least one of the lock housing and the bolt assembly.

15. The steering column assembly of claim 14, wherein the pin housing defines a first pin pocket aligned with the first pocket and a second pin pocket aligned with the second pocket.

16. The steering column assembly of claim 15, wherein the locking assembly, further comprising:
    a first clamp pin extending between the first pin pocket and the first pocket, the first clamp pin being arranged for pivotal movement within the first pin pocket in response to rotation of the adjustment lever about the lever axis; and
    a second clamp pin extending between the second pin pocket and the second pocket, the second clamp pin being arranged for pivotal movement within the second pin pocket in response to rotation of the adjustment lever about the lever axis.

17. The steering column assembly of claim 16, wherein at least one of the first clamp pin and the second clamp pin are disposed perpendicular to the lever axis while the locking assembly is in the locked position.

18. The steering column assembly of claim 16, wherein at least one of the first clamp pin and the second clamp pin are disposed in a non-perpendicular relationship with respect to the lever axis while the locking assembly is in the unlocked position.

19. A steering column assembly, comprising:
    a jacket assembly extending along a steering column axis, the jacket assembly is connected to a support bracket;
    a locking assembly connected to the support bracket, the locking assembly movable between a locked position that inhibits movement of the jacket assembly relative to the steering column axis and an unlocked position that facilitates movement of the jacket assembly relative to the steering column axis; and
    an adjustment lever connected to the locking assembly and extending along a lever axis that is disposed parallel to the steering column axis, the adjustment lever being arranged to rotate about the lever axis to move the locking assembly between the locked position and the unlocked position, wherein the adjustment lever includes a first portion extending directly from the locking assembly along the lever axis, a second portion that extends from the first portion, and a handle connected to the second portion, wherein the first portion is arranged to rotate about the lever axis to move the locking assembly between the locked position and the unlocked position, wherein the second portion is arranged to move relative to the first portion during an adjustment of the jacket assembly along the steering column axis.

\* \* \* \* \*